(12) United States Patent
Gonidec et al.

(10) Patent No.: US 6,837,459 B2
(45) Date of Patent: Jan. 4, 2005

(54) AIR INTAKE FOR LARGE-SIZE NACELLE WITH ENHANCED TRANSPORTABILITY

(75) Inventors: Patrick Gonidec, Montvilliers (FR); François Pierre Clément Grigis, Toulouse (FR)

(73) Assignee: Aircelle, Harfleur (FR)

( * ) Notice: Subject to any disclaimer, the term of this patent is extended or adjusted under 35 U.S.C. 154(b) by 122 days.

(21) Appl. No.: 10/239,184
(22) PCT Filed: Aug. 9, 2001
(86) PCT No.: PCT/FR01/02583
§ 371 (c)(1), (2), (4) Date: Jan. 29, 2003
(87) PCT Pub. No.: WO02/14149
PCT Pub. Date: Feb. 21, 2002

(65) Prior Publication Data
US 2004/0000615 A1 Jan. 1, 2004

(30) Foreign Application Priority Data
Aug. 11, 2000 (FR) .......................................... 00 10567

(51) Int. Cl.$^7$ .......................... B64C 15/00; B64C 15/04
(52) U.S. Cl. ................... 244/53 B; 244/53 R; 244/120; 244/129.1; 244/129.4
(58) Field of Search .............................. 244/53 B, 53 R, 244/120, 129.1, 129.4; 415/119, 9

(56) References Cited

U.S. PATENT DOCUMENTS

| | | | | |
|---|---|---|---|---|
| 4,534,167 A | * | 8/1985 | Chee | .......................... 415/119 |
| 6,131,855 A | * | 10/2000 | Porte | ......................... 244/53 B |
| 6,328,258 B1 | * | 12/2001 | Porte | ........................ 244/53 R |

FOREIGN PATENT DOCUMENTS

| | | |
|---|---|---|
| FR | 2 731 049 | 8/1996 |
| FR | 2 757 823 | 7/1998 |

* cited by examiner

Primary Examiner—Michael J. Carone
(74) Attorney, Agent, or Firm—Oblon, Spivak, McClelland, Maier & Neustadt, P.C.

(57) ABSTRACT

An air intake of a turbofan engine, capable of being fixed at the front of an engine casing enclosing the fan. The air intake includes an annular inner wall, an annular outer cowl radially spaced apart from the inner wall and of the outer cowl, a front annular partition linking downstream ends of the inner wall and of the outer cowl, a rear annular flange located in an extension of the inner wall to fix the air intake in front of the engine casing, and a front annular lip that forms with the front partition an annular de-icing chamber capable of being connected to a defrosting system. The air intake is made in at least two separable parts. The separation plane of the two parts passes outside the de-icing chamber, the inner wall, and the rear flange, and cuts out a dome in the outer cowl and a crescent with rectilinear edge in the rear partition.

11 Claims, 7 Drawing Sheets

AIR INTAKE FOR LARGE-SIZE NACELLE WITH ENHANCED TRANSPORTABILITY

The invention relates to the field of aircraft turbine engines.

It relates more specifically to an air intake to the fan of a turbofan engine, which intake is intended to be fixed to the front of an engine casing enclosing said fan, and comprises an annular internal wall, an annular external cowl spaced radially away from the internal wall, an annular rear partition connecting the rear ends of the internal wall and of the external cowl, an annular front partition connecting the front ends of the internal wall and of the external cowl, an annular rear flange situated in the continuation of the internal wall and intended for securing said air intake to the front of the engine casing and an annular front lip which, with the front partition forms an annular de-icing chamber which can be connected to a de-icing system.

Such an air intake of annular overall shape constitutes the front part of the nacelle surrounding the fan of a turbofan engine.

This air intake has to be transported from its place of manufacture to the place of final assembly on the airplane, either by way of original equipment or by way of replacement equipment when, for maintenance reasons, it is necessary to replace a defective air intake of a nacelle.

Transporting spare air intakes to airports which need them makes it possible to reduce the stock of parts in the air while at the same time allowing the airplanes to have a minimum maintenance downtime.

For reasons of expedience, it is beneficial for spare parts, particularly air intakes, to be transported by airplane.

When the dimensions so permit, the air intake is positioned as a single piece in a container provided for that purpose. This container must not exceed certain dimensions, in order to allow the container to be introduced into the hold of a sufficient number of airplanes in service.

When the dimensions of the air intake are too great to allow it to be transported in a single piece, this air intake is currently produced as two half-shells joined along a midplane. These two half-shells can then be transported separately in smaller containers. The two half-shells are then assembled in situ.

This division affects the structure of the air intake and weakens it because all its constituent parts are split into two: the rear flange, the rear partition, the de-icing chamber, the external cowl and the internal wall. It is therefore necessary to make a very rigid connection between the two half-shells in order to re-establish the rigidity of the structure. The system for fixing the two half-shells therefore leads to a very great additional mass.

There is also the problem of mounting the two half-shells when the air intake is at the place of assembly. It is necessary to use heavy and bulky tooling to position the two half-shells. This mounting is lengthy and the additional cost entailed as a result of having to have qualified personnel for the final assembly of the air intake may prove high.

Finally, dividing the air intake into two half-shells itself entails dividing the de-icing chamber. It is therefore necessary to ensure a perfect seal of the de-icing chamber when the two half-shells are joined back together at the place of assembly.

The object of the invention is to provide an air intake made in two separable and joined-together parts, it being possible for these two parts to be transported in a container by airplane and joined together easily at the place of assembly, and which alleviates the drawbacks of the two half-shells mentioned hereinabove.

The invention achieves its objective through the fact that the plane of separation of the two parts passes on the outside of the de-icing chamber, of the internal wall and of the rear flange and cuts a cap from the external cowl and a crescent with a straight edge from the rear partition so as to form a structural main part which wholly comprises the rear flange, the internal wall and the de-icing chamber and comprises most of the external cowl except for the cap, and most of the rear partition except for the crescent, means being provided for fixing the cap and the crescent to said main part later.

By virtue of the arrangement of the plane of separation according to the invention, the main part maintains its structural integrity and no problem of sealing the deicing chamber during assembly of the air intake arises. Furthermore, the cutting lines are markedly shorter by comparison with the lines of cutting into two half-cylinders according to the prior art. The additional mass due to the means of connecting the two parts is markedly reduced, especially since the connecting means do not contribute to the rigidity of the structure.

Furthermore, the size of the container for the main part is reduced in the direction roughly perpendicular to the plane of separation.

The arrangement of the plane of separation will be chosen in such a way that the width of the main part in the direction roughly perpendicular to the plane of separation is minimized. This plane of separation may, for example, be roughly perpendicular to the leading edge of the lip and the main part is placed via its rear flange on an oblique support arranged in the container.

It will be appreciated that, with the proposed solution, it is easy to mount the crescent and the cap on the main part either before the air intake is fixed to the engine casing or after the main part has been mounted on the engine casing.

The cap and the crescent may form a preassembled secondary part or may be kept separate prior to mounting on the main part.

The cutting line of the cap may be curved and contained in a geometric plane containing the straight edge of the crescent. However, the cap may also be of trapezoidal of rectangular shape. As a preference, certain edges of the cap will be contained in a geometric plane so as to facilitate the machining of the means of fixing the cap to edging strips mounted on the cutting edges of the external cowl part secured to the main part.

To facilitate access to the de-icing system, the cap advantageously forms a hatch for accessing this de-icing system. The pipe conveying fluid from the de-icing system therefore passes advantageously through the rear partition at the plane of separation of the two parts.

According to a first embodiment, the plane of separation is arranged in the lower region of the air intake. This arrangement applies in particular when a single plane of separation is enough to reduce the width of the main part so that it can fit without problem into the holds of existing transport airplanes. What happens is that certain turbofans have a bulge in their lower region because of the presence of the auxiliaries under the engine casing.

In a second embodiment, which does not preclude the first, the air intake for example being wider than it is tall when viewed from the front, it is possible to provide two diametrically opposite and parallel lateral planes of separation. In this case too, the main part maintains the integrity of the de-icing chamber, of the internal wall and of the rear flange.

In all cases, it will be contrived for the rear partition, reduced by one or more crescents, to maintain an annular shape with enough rigidity at the cutting lines of the crescents.

The crescent or crescents may be fixed rigidly to the main part so as to re-establish the structural integrity of the original rear wall, if need be. If it is, then the cap or caps may be fixed removably to the main part to form inspection hatches. They may also be mounted on the main part by means of hinges. These hinges may be articulated at the straight edge of the crescent, at the front edge of said cap or at a side edge of a cap if this cap has roughly straight edges. The cap, removed by cutting from the external cowl, may also be split into sub-elements forming access doors gaining access to the inside of the air intake.

It is to be noted that the cap and the crescent have dimensions and weights which are relatively low by comparison with those of the main part. They can therefore be handled by the assembly or maintenance crew without special tooling.

Other advantages and features of the invention will become apparent on reading the following description which is given by way of example and with reference to the appended drawings in which:

FIGS. 1 to 3 show an air intake to a fan of a turbofan engine, which intake is intended to be fixed to an annular engine casing enclosing the fan, via an annular rear flange 1.

Figure 1:
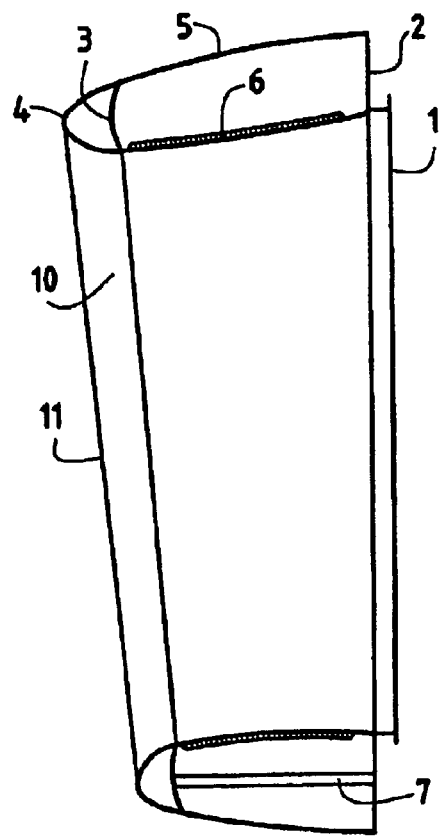
FIG. 1 is a section on a vertical mid-plane of an air intake according to the invention.

This rear flange 1 is situated in the rear continuation of a honeycomb acoustic internal wall 6 which is roughly of revolution about the axis of rotation of the fan. The air intake also comprises an external cowl 5 spaced radially away from the internal wall 6, which cowl is connected by its rear end to the external wall 6 by a radial and annular rear partition 2 and is connected by its front end to the downstream end of the internal wall 6 by a front partition 3. An annular front lip 4 with an aerodynamic profile connects the edges of the front partition 3 and defines therewith a front de-icing chamber 10 of annular shape in front of the air intake. The reference 11 denotes the leading edge of the front lip, this leading edge habitually being inclined slightly forward with respect to the axis of rotation of the turbofan, for aerodynamic reasons at take-off.

This air intake is intended to be mounted at the front of the engine casing and constitutes the front element of the nacelle. It is mounted either as original equipment at the engine assembly site, or as replacement equipment if an air intake needs to be replaced having suffered foreign-object damage, for example.

The reference 7 denotes a pipe for conveying hot air under pressure to the de-icing chamber 10. It is important to be able to gain easy access to the pipe 7 so as to inspect or replace it. What happens is that this pipe 7 conveys air at about 12 bar and 450° C. and is therefore very highly stressed.

This air intake, which may be of large size and have diameter in excess of 3 m, needs to be able to be transported in a container by airplane to the place of assembly with the nacelle.

To this end, the air intake described hereinabove is made in two separable parts that can be joined together along a plane of separation P1 (see FIGS. 2 and 3) which maintains the structural integrity of a main part wholly comprising the de-icing chamber 10, the internal wall 6 and the rear flange 1. This plane of separation cuts a cap 9 from the external cowl 5 and a crescent 8 which has a straight edge 12 meeting the outline 9a of the cap 9.

The elements, cap 9 and crescent 8, detached from the air intake are small in size by comparison with the dimensions of the structural main part.

Figure 5:
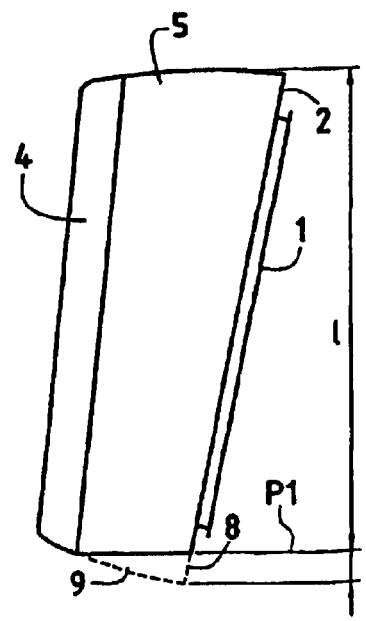
FIG. 5 is a side view of the structural main part.

As is shown in FIG. 5, the plane of separation P1 is arranged in such a way as to minimize as far as possible the width 1 of the main part in the direction perpendicular to the plane P1.

The plane P1 is advantageously roughly perpendicular to the leading edge 11 of the front lip 4, so as to minimize the bulk of the main part in the direction of the width 1 and of the height H.

Figure 6:
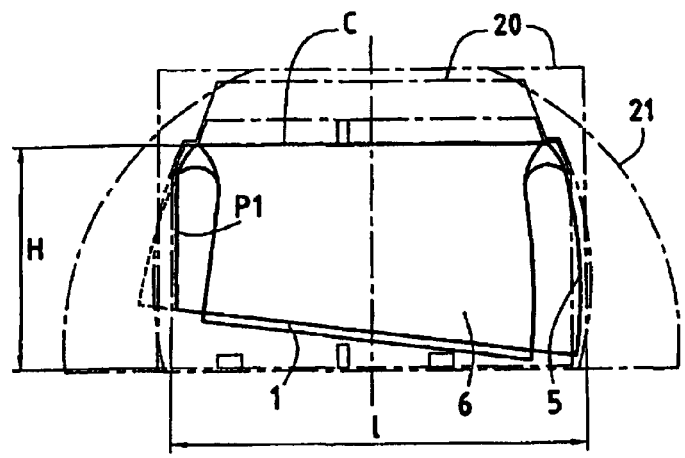
FIG. 6 shows the arrangement of the main part in a container suited to the width of the access door to the hold of an airplane, this main part being depicted in section.
Figure 7:
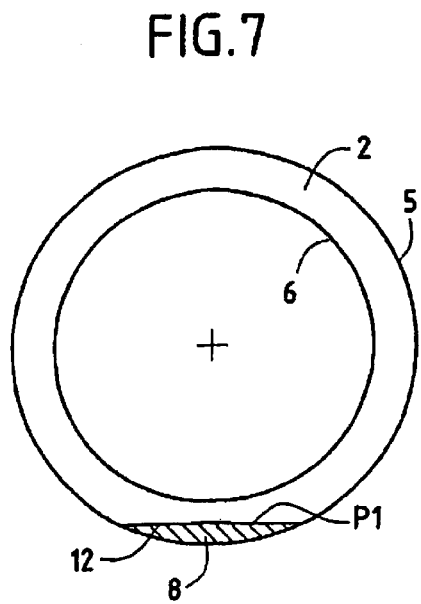
FIG. 7 is a front view of a rear partition after a crescent has been cut from the lower region.

The main part is placed via the rear flange 1 on an oblique support provided in the bottom of a transport container C and the leading edge 11 is in a horizontal plane, as can be seen clearly in FIG. 6. The reference 20 in this FIG. 6 shows the width of the access door to the hold of several airplanes and the reference 21 defines the internal width of the hold of an airplane. It can be seen from this FIG. 6 that removing a cap 9 and a crescent 8, of small dimensions, allows the container containing the main part to be introduced into the airplane.

Figure 4:
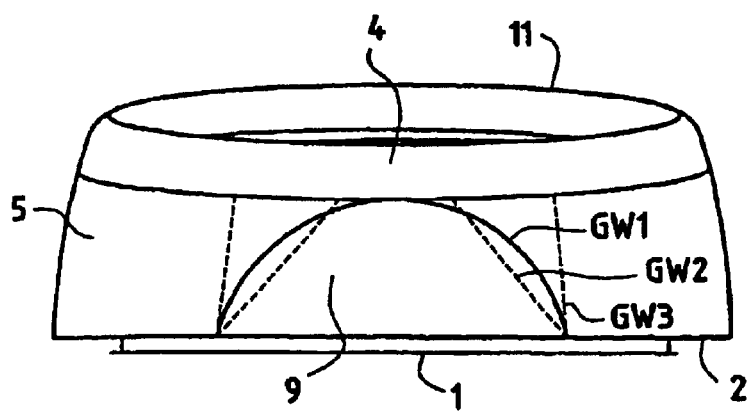
FIG. 4 shows several possible alternative forms of cutout for the cap.

The plane of separation P1 is not necessarily a geometric plane, as shown in FIG. 4.

Figure 2:
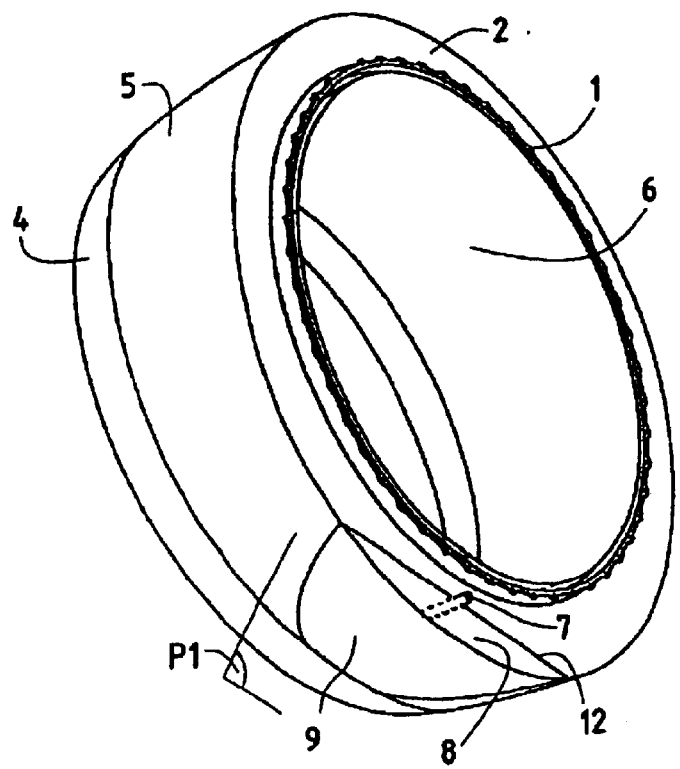
FIG. 2 is a perspective rear view of the air intake of FIG. 1 showing the plane of separation of the air intake into two parts.
Figure 3:
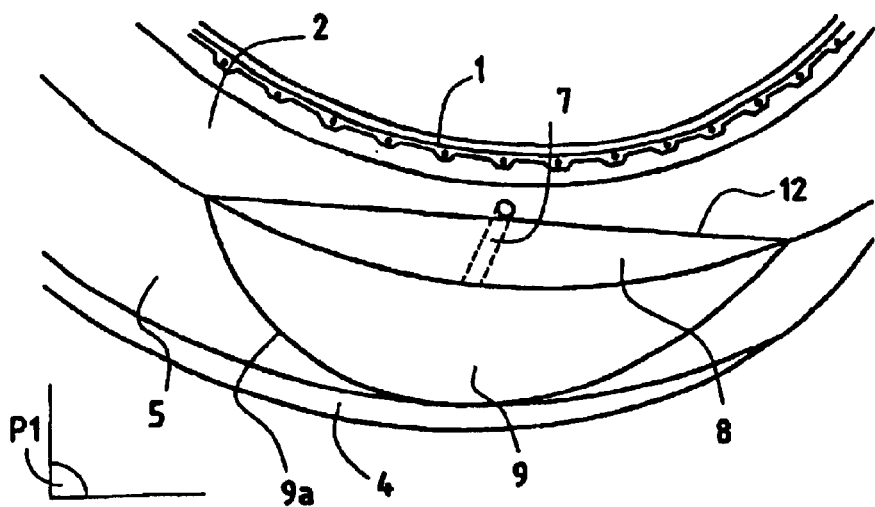
FIG. 3 is a view on a larger scale of the lower region of the air intake of FIG. 2.

When P1 is a geometric plane, the outline GW1 of the cap 9 is curved. In this case, the plane P1 is tangential to the de-icing chamber 10, as shown in FIGS. 2 and 3.

The outline of the cap 9 may have a trapezoidal configuration as shown by the reference GW2 in FIG. 4, or a roughly rectangular configuration as shown by the reference GW3. In this case, the cap 9 is obtained preferably by cutting the outer cowl 5 along perpendicular secant planes in FIG. 4 in the case of the reference GW2, or along planes which are secant on the axis of the fan in the case of the reference GW3.

As shown in FIGS. 2 to 5 and 7, the plane of separation P1 is arranged for example in the lower region of the air intake. However, it is contrived for the edge 12 of the crescent 8 to be far enough away from the internal edge of the rear partition 2 to ensure the structural integrity of the rear partition part 2 of the main part.

Figure 8:
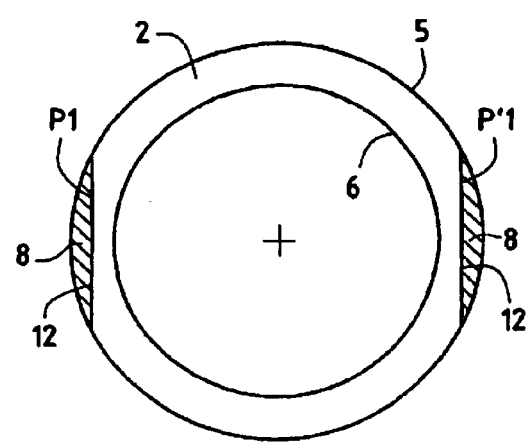
FIG. 8 is a front view of a rear partition after it has been cut along two planes of separation.

FIG. 8 shows an example of the cutting of an air intake along two lateral and diametrically opposed planes of separation P1 and P'1. Here too it is contrived for the edges 12 of the two crescents 8 to be far enough away from the internal edge of the rear partition 2 for structural reasons.

As can be seen in FIGS. 2 and 3, the conveying pipe 7 passes advantageously through the rear partition 2 at the straight edge 12 of the crescent 8.

The crescent 8 and the cap 9 can be fixed to the main part to form a complete air intake before this air intake is mounted on the engine casing. However, the main part may first of all be mounted on the engine casing, followed by the crescent 8 and the cap 9. The crescent 8 and the cap 9 will in all cases advantageously be used as inspection hatches to give access to the components located inside the air intake, for example to the pipe 7.

The cap 9 and the crescent 8 may be fixed to edging strips 15 provided in the edge of the cutouts of the external cowl 5 and of the rear partition 2 of the main part, for example by bolting.

FIGS. 9 to 19 show various solutions for fixing the crescent 8 and the cap 9.

Figure 9:
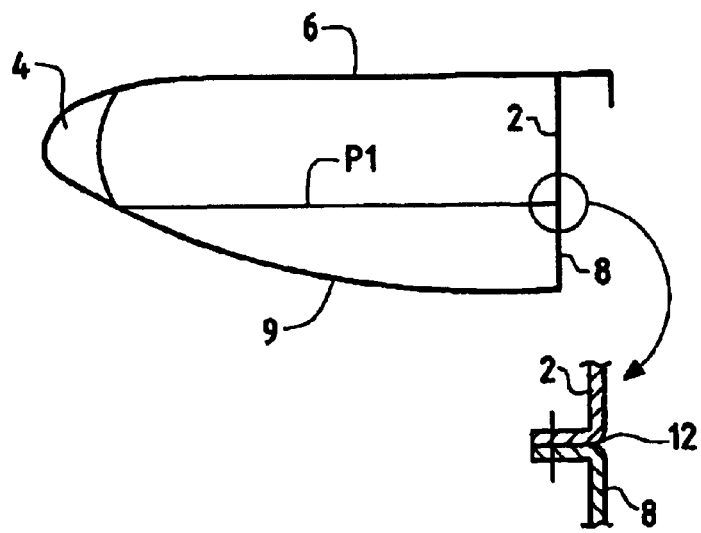
FIG. 9 shows a rigid securing of the crescent to the rear partition.
Figure 10:
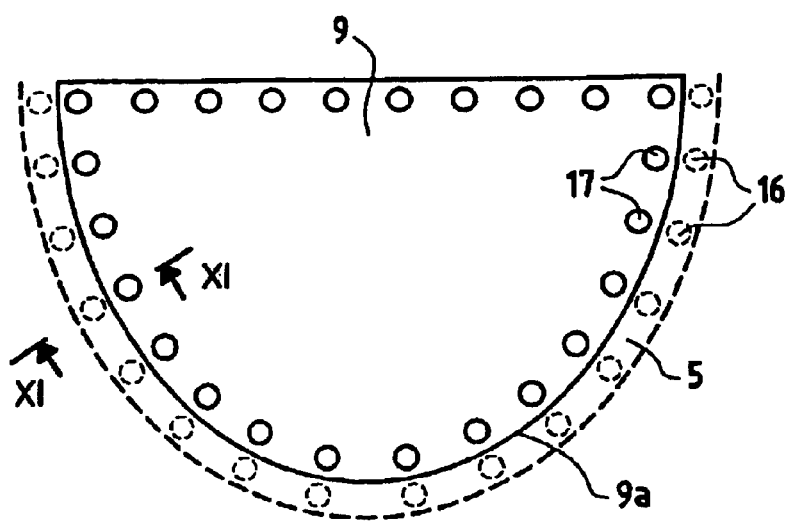
FIG. 10 is an external view of a cap fixed removably to the rear cowl.
Figure 11:
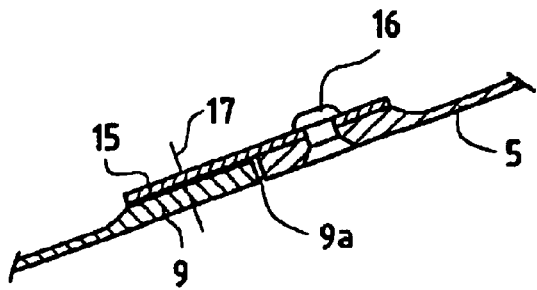
FIG. 11 is a section on XI—XI of FIG. 10.

In FIGS. 9 to 11 it can be seen that the crescent 8 may be fixed to the rear partition 2 by the bolting of flanges provided at the straight edge 12. Edging strips 15 are fixed by riveting to the internal face of the external cowl 5 on the outline 9a. The cap 9 is fixed by bolting to the edging strips 15.

Figure 12:
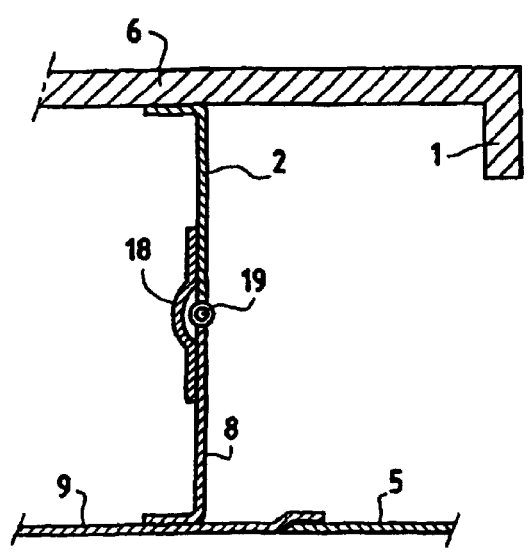
FIG. 12 shows a crescent mounted in an articulated manner on the rear partition, the cap being in the closed position.
Figure 13:
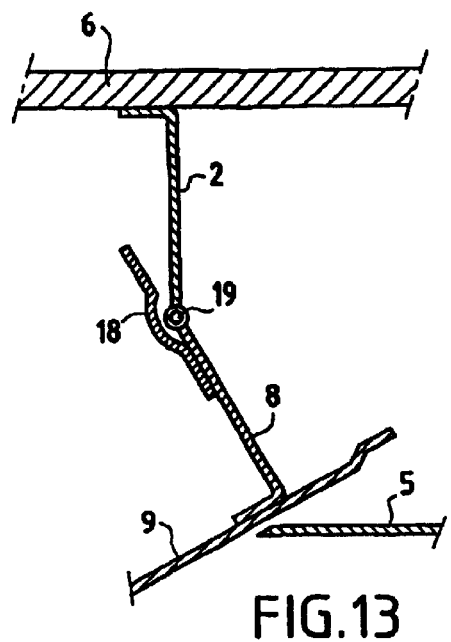
FIG. 13 shows the pivoting of the cap and of the crescent of FIG. 12 into the hatch-open position.

FIGS. 12 and 13 envisage an articulation 19 at the straight edge 12 of the crescent 8. This region is also protected by a fire break 18. The cap 9, secured to the crescent 8, can pivot about the articulation 19. Means are provided for immobilizing the cap 9 on the external cowl 5; these may be bolts or catches for example.

Figure 14:
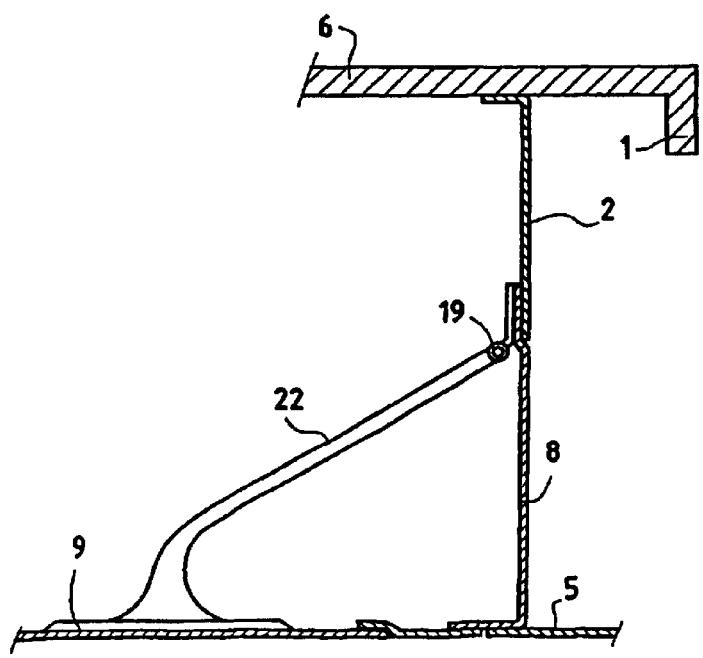
FIG. 14 shows a rigid securing of the crescent to the rear partition and an articulation of the cap to the rear partition.
Figure 15:
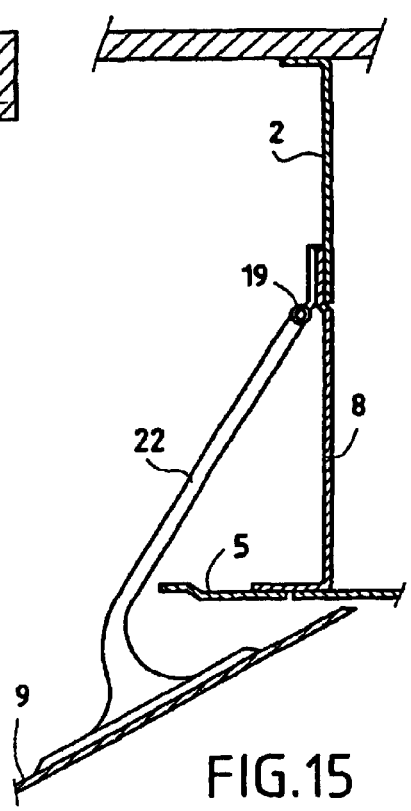
FIG. 15 is identical to FIG. 14, with the cap in the open position.

FIGS. 14 and 15 show a cap 9 mounted to pivot on the rear partition 2 by means of an articulation 19 provided near the straight edge 12 of the crescent 8, but the latter is fixed to the rear partition 2. The articulation 19 supports several fittings 22 attached to the cap 9. To avoid any fouling on the engine cowl, the downstream connection between the cap 9 and the external cowl 5 is positioned forward of the axis of articulation 19.

The cap 9 may be locked onto the external cowl 5 by a series of bolts or using catches arranged in such a way that the fastening is as sound as possible.

Figure 16:
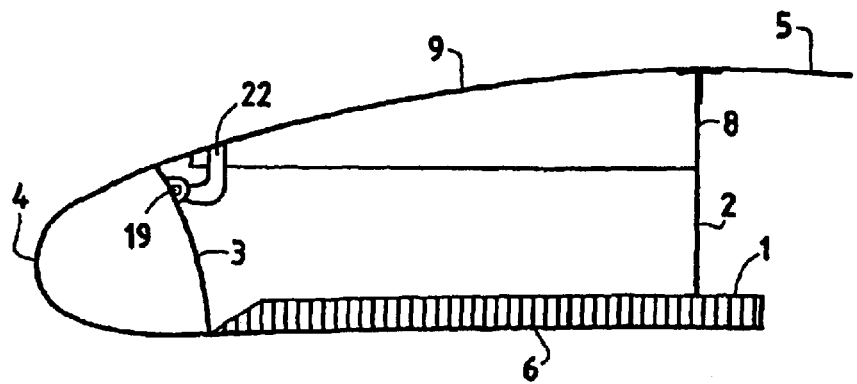
FIGS. 16 and 17 show a cap of trapezoidal shape articulated via the front to the main part.
Figure 17:
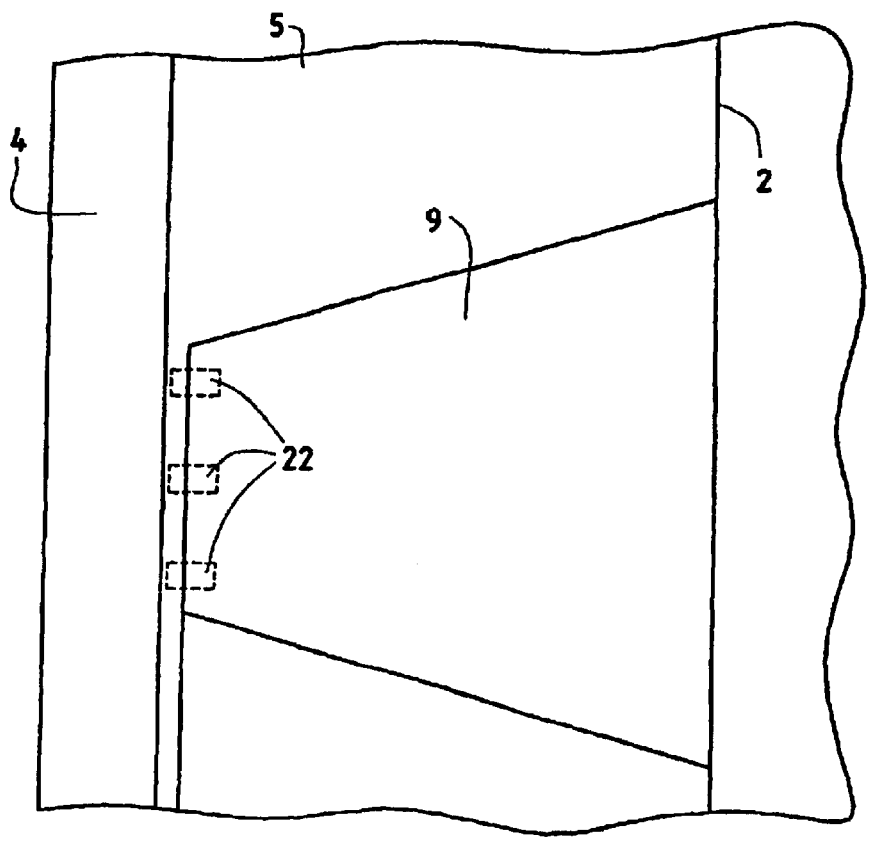

FIGS. 16 and 17 show a crescent 8 fixed rigidly to the rear partition 2 and a cap 9 connected by fittings 22 to an articulation 19 arranged downstream on the front partition 3. The cap 9 tends to close itself under the pressure of the air exerted on the nacelle.

Figure 18:
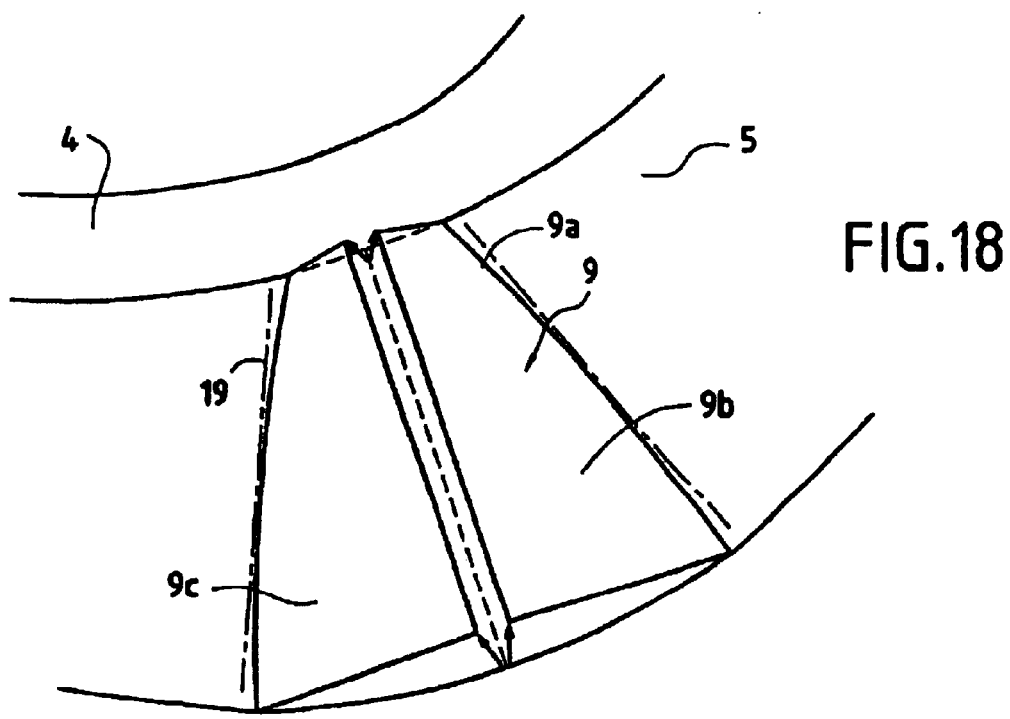
FIGS. 18 and 19 show a cap made in two parts articulated laterally to the outer cowl.
Figure 19:
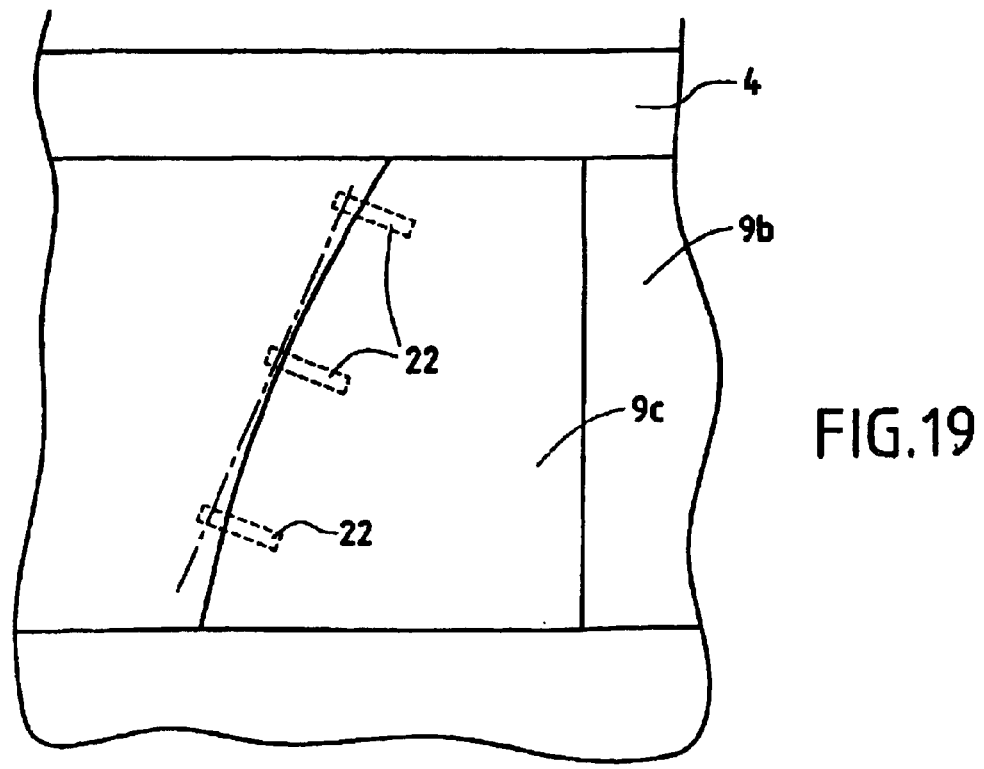

FIGS. 18 and 19 show a cap 9 of trapezoidal shape split into two parts along a median line so as to constitute two leaves 9b, 9c which are articulated laterally by means of fittings 22 on an axis of articulation 19. These leaves are kept in the closed position by catches, for example, or by any other appropriate means.

What is claimed is:

1. An air intake to a fan of a turbofan engine, which air intake is configured to be fixed to a front of an engine casing enclosing the fan, comprising:

an annular internal wall;

an annular external cowl spaced radially away from the internal wall;

an annular rear partition connecting rear ends of the internal wall and of the external cowl, an annular front partition connecting front ends of the internal wall and of the external cowl, an annular rear flange situated in a continuation of the internal wall and configured to secure said air intake to the front of the engine casing and an annular front lip which, with the front partition, forms an annular de-icing chamber configured to be connected to a de-icing system, said air intake being made in at least two separable parts, wherein a plane of separation of the at least two separable parts passes on an outside of the de-icing chamber, of the internal wall and of a rear flange, and cuts a cap from the external cowl and a crescent with a straight edge from the rear partition to form a structural main part that wholly comprises the rear flange, the internal wall, and the de-icing chamber, and comprises most of the external cowl except for the cap, and most of the rear partition except for the crescent, means being provided for fixing the cap and the crescent to the structural main part.

2. The air intake as claimed in claim 1, wherein the plane of separation minimizes a width of the structural main part in a direction roughly perpendicular to the plane of separation.

3. The air intake as claimed in claim 2, wherein the plane of separation is roughly perpendicular to a leading edge of the front lip.

4. The air intake as claimed in claim 1, wherein the cut of the cap is curved and contained in a geometric plane containing the straight edge of the crescent.

5. The air intake as claimed in claim 1, wherein the cap has a rectangular or trapezoidal outline.

6. The air intake as claimed in claim 1, wherein the cap forms a hatch for access to an inside.

7. The air intake as claimed in claim 6, wherein the de-icing system comprises a pipe conveying fluid passing through the rear partition at the plane of separation.

8. The air intake as claimed in claim 1, wherein the plane of separation is arranged in a lower region of the air intake.

9. The air intake as claimed in claim 1, further comprising two diametrically opposed lateral planes of separation.

10. The air intake as claimed in claim 1, wherein the crescent is fixed rigidly to the structural main part by flanges.

11. The air intake as claimed in claim 1, wherein the cap is mounted on the structural main part using hinges.

* * * * *